United States Patent

Heinemann

[11] 3,750,788
[45] Aug. 7, 1973

[54] CLUTCH OR BRAKE
[76] Inventor: Rolf Heinemann, Fraubronnstrasse 28, 7000 Stuttgart 70 (Plieningen), Germany
[22] Filed: Nov. 8, 1971
[21] Appl. No.: 196,546

[30] Foreign Application Priority Data
  Nov. 12, 1970  Germany.................. P 20 55 678.0

[52] U.S. Cl........... 192/107 R, 188/71.3, 192/70.14
[51] Int. Cl............................................ F16d 11/00
[58] Field of Search.................. 192/107 M, 107 R, 192/70.14; 188/218 XL, 71.3

[56]  References Cited
  UNITED STATES PATENTS
  896,389   8/1908  Johnston.......................... 192/107 R
  951,992   3/1910  Johnson........................... 192/107 R
  2,983,351 5/1961  Hindmarch...................... 192/107 M
  2,965,205 12/1960 Winchell.......................... 192/107 R
  3,386,122 6/1968  Mathison......................... 192/107 R FOREIGN PATENTS OR APPLICATIONS
  440,674   6/1925  Germany......................... 192/107 R
  743,192   1/1956  Great Britain.................. 192/107 M Primary Examiner—Charles J. Myhre
Assistant Examiner—Randall Heald
Attorney—Arthur O. Klein

[57]  ABSTRACT

A friction brake or friction clutch in which the wear-resistant brake or clutch surface or surfaces and the associated brake or clutch lining or linings which are adapted to be worn consist of equal sets of directly adjacent teeth of an isosceles triangular shape which fully interengage with each other when the brake or clutch is engaged.

12 Claims, 11 Drawing Figures

PATENTED AUG 7 1973 3,750,788

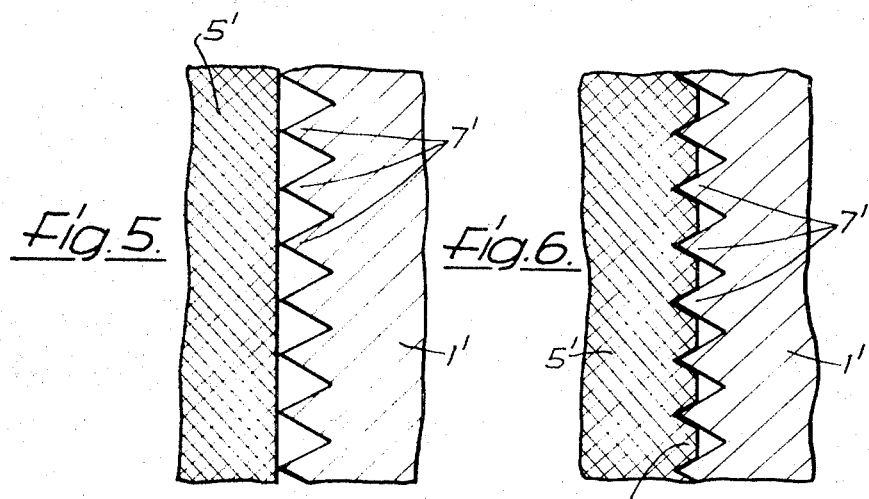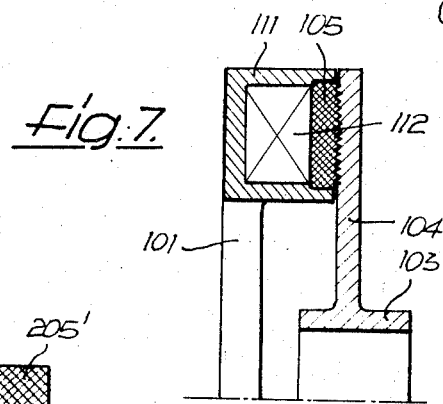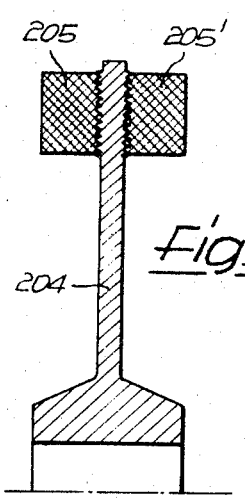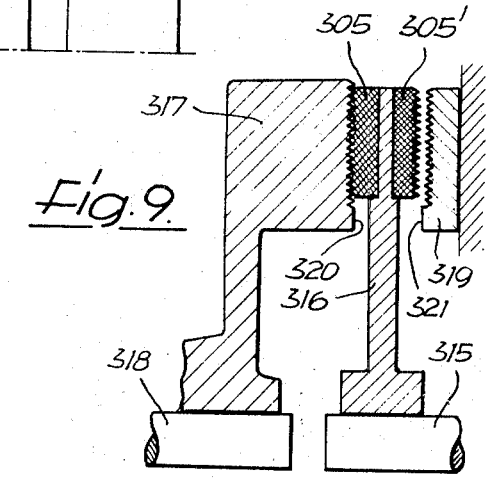

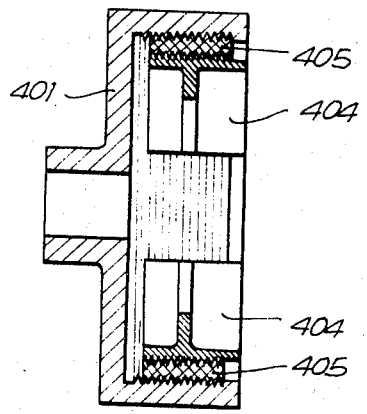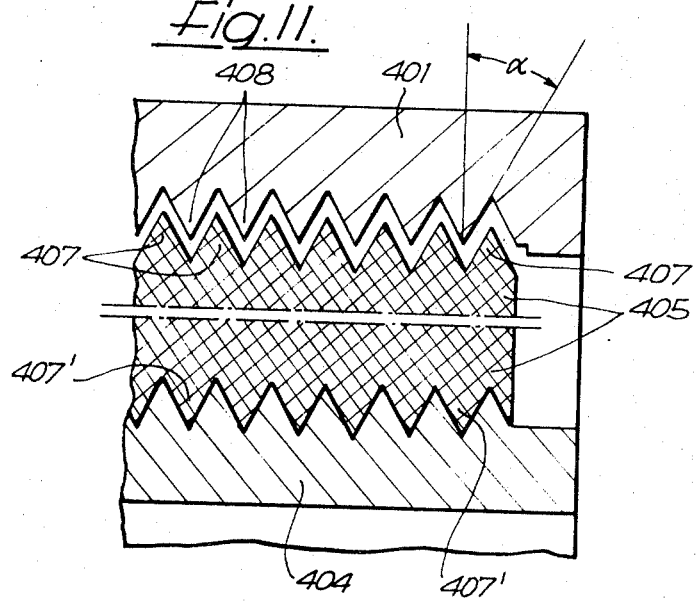

CLUTCH OR BRAKE

The present invention relates to a brake or friction clutch which comprises at least one pair of friction surfaces which are adapted to be moved relative to each other and to be pressed against each other and one of which consists of a wear-resistant material and the other of a material which is adapted to be worn off, and in which at least before the brake or clutch is broken in at least the wear-resistant friction surface consists of a row of ribs or teeth which have an equal cross-sectional shape with inclined flanks and extend in the direction in which the brake or clutch is engaged and disengaged.

Generally speaking, the associated friction surfaces of brakes or friction clutches of a disk-shaped or drum-shaped construction have substantially plane or cylindrical cross-sectional shapes. Although it has also been proposed to provide the friction surfaces in the form of trapezoidal ribs of a relatively great height, the construction of such clutches or brakes has again been abandoned because it was found that the trapezoidal shape and great height of the ribs causes a series of disadvantages.

It is an object of the present invention to provide a brake or friction clutch which has the highest possible rate of economy and operational efficiency, that is, a rate much higher than that of any of the friction clutches or brakes as were known prior to this invention.

For attaining this object, the invention provides a brake or friction clutch of the type as described in the first paragraph above in which the friction surface of the brake or clutch member which consists of a wear-resistant material is formed entirely by the flanks of the ribs or teeth which are located immediately adjacent to each other and each of which has a cross-sectional shape of a triangle of a height which amounts approximately to one-fifth to one-tenth of the maximum thickness of the part of the associated clutch or brake member which consists of a material which is intended to be worn off gradually during the subsequent use of the clutch or brake. It is another requisite feature of the invention that at least when the brake or clutch is broken in the angle $\alpha$ at which each flank of the teeth of each clutch or brake member is disposed relative to a common plane from which all of the teeth project at a right angle has a size within a range in which the tangent of $\alpha$ is larger than the coefficient of friction $\mu$ of the two clutch or brake members on each other.

When changing the usual plane or cylindrical friction surfaces of such a brake or clutch to such a serrated cross-sectional shape it is possible when pressing these surfaces against each other with the same force as previously employed to increase the friction between them to at least twice the previous value. This increased friction which does not require the friction surfaces to be made of any materials different from those which are conventionally used for such clutches or brakes permits a clutching or braking operation to be carried out very effectively by means of a much smaller muscular force than was previously required or merely by a muscular force when previously a force amplifier had to be used. When using the same force as previously, it is now also possible to produce the same frictional force by making the friction surface of the brake or clutch member which consists of a wearable material, for example, that of a brake or clutch lining, of a material which produces a lower coefficient of friction and usually has a higher wear resistance, so that the brake or clutch requires less service or may not require any service at all.

Since the ribs or teeth only have to have a relatively low height, the costs of producing them are very low. This is important especially if the materials of which they are made can be machined only with difficulty. By making the teeth of a triangular cross section, those which consist of a wearable material also do not have to be provided with ribs or teeth, and because of the low height of the teeth, it will require only a short time until the wear-resistant teeth of one clutch or brake mamber have worn exactly corresponding grooves into an originally plane or cylindrical surface of the other member of a wearable material or untl they have worn the grooves of this other member so that the flanks of all teeth of both members when applied upon each other will be in full engagement with each other. Since the teeth or ribs grooves only have to be provided in the clutch or brake member which consists of a wear-resistant material, the difficulty and costs of producing the other clutch or brake member of a wearable material will be reduced and the latter may even be made of a material which cannot be normally machined economically.

By making the teeth of a very small size, the wearable material, for example, that of a brake or clutch lining, may be worn to such an extent that when the latter permits no further wear by the wear-resistant teeth of the other clutch or brake member without causing permanent damage to the clutch or brake, only a set of teeth will practically remain of the wearable material which has a very small volume as compared with the original volume of this member. Furthermore, during the entire wear upon this member the friction between both members will not vary. Therefore, contrary to a clutch or brake with teeth of a trapezoidal shape, the wear upon the wearable member is not limited to the height of the original teeth thereon or to the height of the teeth as originally worn into this member by the wear-resistant teeth of the other member, but the wearable member may be worn off almost completely, Since there is no need to interrupt the friction surface of the wearable member, i.e., the surfaces of its teeth, by teeth or ribs which were previously also required, the material of this member may be utilized for a still greater length of time.

Another feature of the invention consists in providing the clutch or brake member which is to be applied against the other wear-resistant serrated member with a lining of a wearable material which is also provided on its side which is to be secured to this clutch or brake member with a set of teeth of a size and shape corresponding to the teeth on its other side or to be worn into this other side by the wear-resistant teeth of the other member. The two sets of teeth on this lining should, however, be offset laterally relative to each other at a distance of one half tooth. in this event, the wear-resistant teeth may wear off the material of the lining almost entirely and almost to the roots of the teeth which are provided in the other clutch or brake member for carrying the lining.

It is a further advantage which is attained by making the friction surfaces of a clutch or brake of the serrated shape as described that the clutch or brake lining may be made relatively thin.

The triangular cross section of the teeth permits them to form a continuous uninterrupted row so that the entire surface area which is formed by the flanks of these teeth may be utilized for producing the desired friction, that is, a friction which is considerably increased over that which is attainable if the friction surfaces are plane or cylindrical. If therefore a predetermined normal force is applied for pressing the two clutch or brake members against each other, the friction surface of the wearable part or lining on one clutch or brake member will be subjected by the other member only to a minimum of pressure per square inch. Furthermore, if the angle $\alpha$ of the flanks of the teeth of both clutch or brake members is made of a size within a range in which the tangent of $\alpha$ has a larger value than the coefficient of friction, there will be no danger that, when the two clutch or brake members are to be disengaged from each other, any binding or locking effect might occur between the teeth of both clutch or brake members.

The highest possible frictional force may be attained if the angle $\alpha$ of the tooth flanks is made of such a size that the ratio between the coefficient of friction and the sine of the angle $\alpha$ will have approximately a value of 1. However, in some cases in which, for example, in an order of clutches or brakes of the same outer dimensions some of these clutches or brakes should produce a different frictional force than the others, it may be desirable to make the angle $\alpha$ of a size which will not produce the highest possible friction. This may also be done, for example, by making the angles of the two flanks of each tooth of different sizes.

Another feature of the invention consists in providing the two associated clutch or brake members with abutments which will engage with each other when the part of the wearable material of one member, for example, the lining of such a material, has been worn off to the greatest permissible extent by the wear-resistant teeth of the other member so that these teeth cannot possibly grind into, or be ground off or damaged otherwise by, the clutch or brake member itself which carries this part or lining.

The brake or clutch according to the invention may be either of a disk-shaped or drum-shaped construction since the two sets of friction teeth may be either provided on associated brake or clutch members which are movable relative to each other in the direction of the axis of rotation of at least one of these members, and these two sets then project toward each other from the sides of these members which extend vertically to this axis of rotation, or these two sets of teeth may be provided on a peripheral surface of a drum-shaped clutch or brake member and on at least one clutch or brake member which may be pressed against this peripheral surface.

The features and advantages of the present invention will become more clearly apparent from the following detailed description thereof which is to be read with reference to the accompanying drawings, in which FIG. 1 shows diagrammatically a longitudinal section of a part of a disk clutch or disk brake;

FIG. 5 shows an enlarged sectional view of a clutch or brake similar to that as shown in FIGS. 3 and 4 but in which before the clutch or brake is used for the first time, that is, before it has been broken in, only the highly wear-resistant friction surface has a serrated cross section;

FIG. 6 shows a view of the part of the clutch or brake according to FIG. 5 in a condition while being broken in;

FIG. 7 shows diagrammatically a longitudinal section of a part of a clutch or brake which is operated electromagnetically;

FIG. 8 shows diagrammatically a longitudinal section of a part of another embodiment of the invention in the form of a brake;

FIG. 9 shows diagrammatically a longitudinal section of a part of another embodiment of the invention in the form of a combination of a clutch and a brake;

FIG. 10 shows diagrammatically a cross section of another embodiment of the invention in the form of a drum brake; while FIG. 11 shows an enlarged view of a art of the brake according to FIG. 10.

Figure 1:
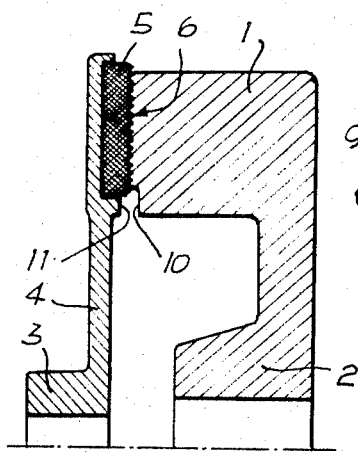
Figure 2:
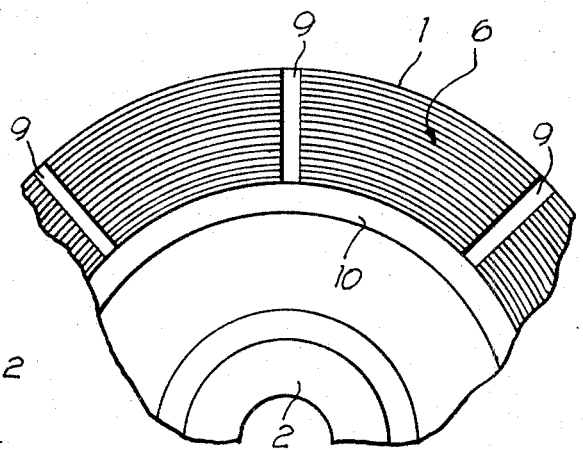
FIG. 2 shows a front view of the friction surface of the friction disk according to FIG. 1 which consists of a highly wear-resistant material.

In the drawings, FIGS. 1 and 2 show a part of a friction disk clutch or friction disk brake all parts of which other than those specifically described herein may be of a conventional construction and which comprises a cylindrical friction disk 1 of metal which in this particular embodiment of the invention is integral with its hub 2. This friction disk 1 and its hub 2 extend coaxially to a disk 4 and its hub 3 which are rotatable together relative to the friction disk 1 about a common axis. In addition, disk 4 may be shifted in its axial direction relative to friction disk 1 by suitable means, not shown, for pressing it against the annular surface forming the friction surface 6 of disk 1. The side of disk 4 facing the annular surface of disk 1 carries an annular friction member or lining 5 which forms the second friction member and consists of a friction material of which such linings or the like are usually made. This friction lining 5 has inner and outer diameters substantially corresponding to those of the friction surface 6 of disk 1.

The friction clutch or friction brake according to the invention differs essentially from those of a conventional construction by the fact that the entire friction surface 6 of the disk 1 is provided in the form of annular ribs or teeth 7 which extend concentrically to the axis of rotation, all have an equal size and an equal cross-sectional shape of an isosceles triangle, and are directly adjacent to each other. In this particular embodiment of the invention as shown more clearly in FIGS. 3 and 4, each of these teeth 7 projects from the disk 1 at an angle of 60° and each flank of each tooth extends at an angle $\alpha$ of 30° to the center of the tooth. The height of these teeth 7 may amount to about 0.5 mm up to about 1 mm.

Figure 3:
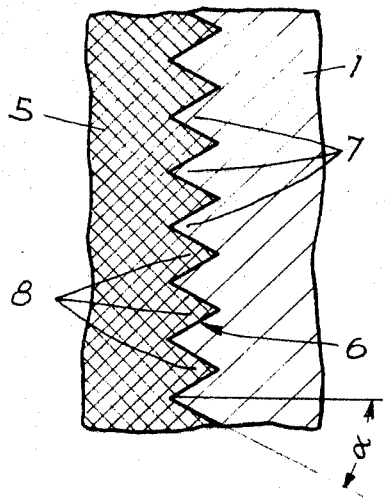
FIG. 3 shows an enlarged view of a part of FIG. 1.

The friction surface of the friction member or lining 5 facing the friction surface 6 of disk 1 is likewise provided in the form of annular ribs or teeth 8 which have a cross-sectional shape corresponding to that of the teeth 7 and are radially offset by one half tooth relative to the latter so that, when disk 4 is shifted toward the friction element to the position as shown in FIG. 3, the corresponding flanks of all teeth 7 and 8 will engage upon each other. Teeth 8 therefore also have the same height as the teeth 7.

The increase of the frictional force which may be attained when the flanks of teeth 7 and 8 are pressed against each other as compared with the frictional force which is attainable between two plane or cylindrical friction surfaces equals the reciprocal value of the sine of the flank angle $\alpha$. If the normal force with which the friction lining 5 is pressed against the friction surface 7 is called $P_N$, the coefficient of friction of the two materials of which the friction surfaces of teeth 7 and 8 is called $\mu$ and the frictional force attainable is called $P_R$, this last force will amount to $$P_R = (1/\text{sine } \alpha) \cdot \mu \cdot P_N.$$

The factor ($1/\text{sine } \alpha$) may be called the increasing factor by which the frictional force is increased due to the cross-sectional shape of the toothlike friction surfaces over the frictional force which is attainable between two plane friction surfaces when the pressure $P_N$ is equal in both cases. This increasing factor solely depends upon the angle $\alpha$ of the tooth flanks. However, in order to prevent any self-locking action between two friction surfaces when trying to separate them from each other, the condition must be maintained that the value of tg $\alpha$ is larger than the value of $\mu$. When making the friction surfaces according to the invention of materials which are conventionally employed for friction surfaces, it is possible to make the flank angles, for example, of the following sizes and to attain the following increasing factors:

| Coefficient of Friction $\mu$ | Flank Angle $\alpha$ | tg $\alpha$ | sine $\alpha$ | Increasing Factor 1/sine $\alpha$ |
|---|---|---|---|---|
| 0,5 | 30° | 0,59 | 0,500 | 2 |
| 0,35 | 22,5° | 0,41 | 0,383 | 2,6 |
| 0,25 | 15° | 0,27 | 0,259 | 3,9 |

The teeth may be made of a relatively low height. Good results may still be attained if at a total thickness of the friction lining 5 of, for example, 5 mm, the height of the teeth amounts to one-tenth to one-fifth of this thickness.

Figure 4:
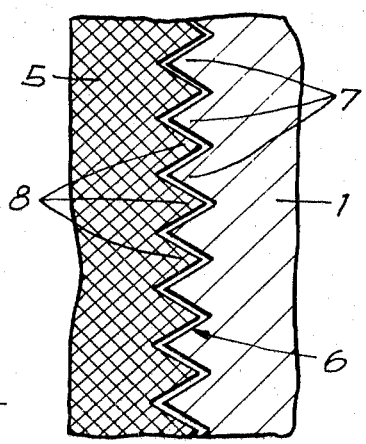
FIG. 4 shows a view which is similar to FIG. 4, but in which the two friction surfaces are separated at a sufficient distance from each other as may be required for disengaging the clutch or brake.

The gap which is required for disengaging the flanks of teeth 7 and 8 and thus their friction surfaces from each other may be made very small, as indicated in FIG. 4. Disk 4 therefore only needs to be shifted for a very small distance relative to disk 1 to press it against or to retract it from the latter.

As illustrated in FIG. 2, the friction surface 6 is provided with grooves 9 which extend in radial directions through the teeth 7 and have a depth greater than the height of these teeth. These grooves 9 serve for removing the dust which might be produced by the wear of teeth 7 on the surfaces of teeth 8. All of these grooves are equal and the radii in which they are provided also extend from the axis of disk 1 at equal angles relative to each other. While in the case as shown in FIG. 2 disk 1 is provided with eight of these grooves 9, their number may also be larger or smaller. Disks 1 and 4 are further provided with annular shoulders 10 and 11 which are adapted to abut against each other when the teeth 7 on disk 1 have worn off the friction lining 5 to the greatest permissible extent.

The embodiment of the invention as illustrated in FIGS. 5 and 6 differs from that as shown in FIGS. 1 to 4 merely by the fact that originally only disk 1' which consists of a highly wear-resistant material is provided with teeth 7', while the annular friction lining 5' which is secured to the other disk of the clutch or brake originally has an unserrated surface. Before it can be used effectively, the clutch or brake must therefore first be broken in by pressing the two disks against each other until the teeth 7' have ground corresponding teeth into the lining 5'. However, it will only take a relatively short time until the teeth 7' which have only a low height, as pointed out with reference to FIGS. 1 to 4, will wear tooth gaps of such a depth into the surface of lining 5' that between these tooth gaps teeth 8' are formed, as shown in FIG. 6, which have approximately one half of the height of the teeth 7'. By numerous tests it has been found that, when the two friction disks are pressed in this condition against each other, the clutching or braking effect between the parts of the flanks of teeth 7' which engage with the flanks of the only partly formed teeth 8' will already be substantially the same as the clutching or braking effect which will be attained if the teeth 7' are fully worn into the lining 5' and have formed corresponding teeth therein and the flanks of both sets of teeth are fully in engagement with each other.

FIG. 7 illustrates another embodiment of the invention in the form of an electromagnetically actuated clutch or brake the friction surfaces of which have again a serrated cross section like those of the embodiment as shown in FIGS. 1 to 4. However, in this case the annular serrated friction lining 105 which is adapted to engage with the teeth on the metallic disk 104 on a hub 103 is secured to a brake or clutch member 101 which is mounted concentrically to disk 104 and has an annular part 111 of a U-shaped cross section the open side of which faces disk 104 and is closed by the friction lining 105. Into the space within the U-shaped part 111 of the brake or clutch member 101 an annular magnet coil 112 is inserted. The friction lining 105 is mounted between the free ends of the two arms of the U-shaped part 111 through which the magnetic flux which is produced when coil 112 is energized flows into disk 104 and thereby draws the serrated friction surface of the latter against the corresponding serrated friction surface of the lining 105.

FIG. 8 shows a further embodiment of the invention in the form of a brake in which a rotatable brake disk 204 is provided on both lateral sides of an annular end part with wear-resistant serrations similar to those as described with reference to FIGS. 1 to 4. Against both of these sets of serrations at least two nonrotatable brake shoes 205 and 205' which are provided with corresponding serrations are adapted to be moved simultaneously in opposite directions parallel to the axis of rotation of disk 204. These brake shoes may consist either entirely of a material which is conventionally used for brake linings or at least the parts thereof facing disk 204 and terminating into the serrations which are adapted to engage with the serrations on disk 204 may consist of a wearable material.

FIG. 9 illustrates the present invention as being applied to the combination of a clutch and a brake. A disk 316 is nonrotatably connected to a driven shaft 315 but slidable in opposite axial directions along or together with this shaft. On each lateral side, this disk 315 carries an annular friction lining 305 or 305', respectively, which extends coaxially to shaft 315 and is provided on its outer side with a set of teeth similar to the teeth 8 on the lining 5 as shown in FIGS. 1 to 4. By a movement of disk 316 toward the left of FIG. 9, the serrated side of the friction lining 305 may be pressed against a corresponding set of teeth on a clutch disk 317 which is nontatably connected to a drive shaft 318, while by a movement of disk 316 toward the right of FIG. 9 this disk will be disengaged from the clutch disk 317 and the serrated side of the other friction lining 305' may be pressed against a corresponding set of teeth on a relatively stationary brake member 319. By providing both sides of disk 316 with serrated friction linings 305 and 305', disk 316 may be connected either by muscular force or by suitable means with a high friction either with the serrated side of clutch disk 317 or with the serrated side of brake member 319.

In order to prevent the teeth on clutch disk 317 or on the brake member 319 from engaging with disk 316 when one or the other friction lining 305 or 305' has been worn off, clutch disk 317 as well as brake member 319 is provided with an annular shoulder 320 or 321, respectively, which will engage with disk 316 when the lining 305 or 305' has been worn off to the greatest admissible extent.

FIGS. 10 and 11 illustrate the application of the invention to a drum brake which is of a conventional construction with the exception of the serrated shape of its brake surfaces and of the back of the brake linings and the surfaces of the brake jaws carrying these linings. This brake comprises a drum 401 of metal the inner peripheral side of which forms a friction or brake inner peripheral side of which forms a friction or brake surface which consists of a set of wear-resistant teeth 408 extending parallel and directly adjacent to each other and coaxially to the axis of rotation of the drum. Each of these teeth 408 has again a cross-sectional shape of an isosceles triangle which in this particular case forms an angle of 60° so that the angle $\alpha$ between each flank of each tooth relative to a plane extending at right angles to the axis of rotation of the drum through the tip of the tooth amounts to 30°.

At the inside of drum 401 two jaws 404 are mounted in a conventional manner and are adapted to be pressed against the action of springs, not shown, against the serrated brake surface 408 of the drum. Each of these jaws 404 carries a brake lining 405 the outer side of which is provided with a set of teeth 407 which exactly correspond to the teeth 408 on brake drum 401 and are adapted fully to engage with these teeth when the brake is applied and to be retracted therefrom by the springs acting upon the jaws 404 when the brake is released. On its inner side, each brake lining is provided with another set of teeth 407' which are equal to the outer teeth 407 but are offset at a distance of one half tooth in the axial direction of the drum relative to the teeth 407. The inner peripheral surface of drum 401 is also provided with a set of teeth which exactly correspond to the lining teeth 407' and to the surface of which the latter may be secured. All teeth 407, 408, 407' and those on the brake jaws 404 are therefore identical in size, shape and pitch, but teeth 407' are offset in the axial direction of the drum by the distance of one half tooth relative to the teeth 407.

By providing these teeth 407' on the brake linings 405 and the corresponding teeth to which they are secured on the brake jaws 404 and by offsetting these teeth 407' by the distance of one half tooth relative to the teeth 407, the advantage is attained that the brake linings 405 can be worn off practically entirely by the teeth 408, whereas if the inner surfaces of the brake linings and the outer surfaces of the brake jaws 404 to which the brake linings are secured were cylindrical rather than serrated and the brake linings were worn off until the tips of the teeth 408 on drum 401 would touch the outer surfaces of brake jaws 404, a loose set of adjacent teeth of brake-lining material would remain and be wasted as a residue of each brake lining. Of course, such a double set of teeth may also be provided on the linings of clutches and brakes of a disklike construction.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A friction brake or friction clutch comprising at least one first and one second member at least one of which is movable back and forth to the other for disengaging and engaging said members and both members having parts with friction surfaces facing each other, said part of the first of said members consisting of a wear-resistant material and said part of the second member consisting of a wearable material adapted to be worn when at least one of said members is pressed against the other, said friction surface of both of said parts being serrated at least when said brake or clutch is fully broken in and then consisting of teeth extending concentric with the axis of rotation of the respective part and parallel to the direction of the relative sliding-movement between said members and all of said teeth having the same cross-sectional size and shape and having inclined flanks forming the entire friction surface of each part so that the flanks of said teeth of each part are located directly adjacent to each other so as to form a continuous row, each of said teeth including the common base of all teeth of the same part then having a triangular cross section of a height of at least approximately one-fifth to one-tenth of the thickness of said wearable part before being worn, the angle $\alpha$ of each flank of said teeth relative to a plane extending vertically to said common base which extends in the longitudinal direction of said teeth having a tangent larger than the coefficient of friction $\mu$ between the teeth of both parts when pressed against each other.

2. A brake or clutch as defined in claim 1, in which each of said teeth of both parts together with its base has an isosceles triangular cross section at least when said brake or clutch is fully broken in.

3. A brake or clutch as defined in claim 1, in which the angle $\alpha$ of each flank has such a size that the ratio betweeen the coefficient of friction $\mu$ and the sine of the angle $\alpha$ has approximately a value of 1.

4. A brake or clutch as defined in claim 1, in which the angle $\alpha$ has a size of 15° to 30°.

5. A brake or clutch as defined in claim 1, in which the friction surfaces of both of said members which are adapted to engage with each other have a corresponding cross-sectional shape at least when said brake or clutch is fully broken in.

6. A brake or clutch as defined in claim 1, in which said wearable part forms a friction lining which is connected to a supporting surface of said second member, said supporting surface also having a serrated cross-sectional shape corresponding to that of the wearresistant surface of said first member, and the surface of said lining which is connected to said supporting surface having a serrated cross-sectional shape corresponding to that of said supporting surface.

7. A brake or clutch as defined in claim 1, in which said two members are provided with shoulders facing each other and adapted to engage with each other for preventing said wear-resistant teeth of said first member from wearing off said wearable part excessively.

8. A brake or clutch as defined in claim 1, in which at least one of said members is rotatable about a central axis and at least one of said members is movable back and forth relative to the other member in the direction of said axis, the corresponding flanks of said teeth of said wearable and wear-resistant parts having equal angles $\alpha$ at least when said brake or clutch is fully broken in.

9. A brake or clutch as defined in claim 8, in which at least said first member having said wear-resistant part is rotatable, said first member having grooves extending transverse to the longitudinal direction of said teeth and being substantially equally spaced from each other and having a depth greater than the height of said teeth of said wear-resistant part.

10. A brake or clutch as defined in claim 1, in which one of said members is drum-shaped and the serrated friction surface of said member is disposed within a peripheral surface of said member.

11. A brake or clutch as defined in claim 1, in which only said friction surface of said wear-resistant part of said first member was initially serrated, the friction surface of the wear-resistant part of said first member having thereafter worn its teeth into the originally unserrated wearable part of said second member.

12. A brake or clutch as defined in claim 1, wherein the wear-resistant part of the first member is made of metal, and the wearable part of the second member is made of friction brake-lining material.

* * * * *